United States Patent
Nehring

(10) Patent No.: US 9,932,078 B1
(45) Date of Patent: Apr. 3, 2018

(54) UTILITY TRAILER

(71) Applicant: KARAVAN TRAILERS, INC., Fox Lake, WI (US)

(72) Inventor: Joel Nehring, Randolph, WI (US)

(73) Assignee: KARAVAN TRAILERS, INC., Fox Lake, WI (US)

( * ) Notice: Subject to any disclaimer, the term of this patent is extended or adjusted under 35 U.S.C. 154(b) by 0 days.

(21) Appl. No.: 15/282,309

(22) Filed: Sep. 30, 2016

(51) Int. Cl.
  *B60D 1/00* (2006.01)
  *B62D 63/06* (2006.01)
  *B62D 63/08* (2006.01)
  *B60P 1/43* (2006.01)

(52) U.S. Cl.
  CPC .............. *B62D 63/061* (2013.01); *B60P 1/43* (2013.01); *B62D 63/062* (2013.01); *B62D 63/08* (2013.01)

(58) Field of Classification Search
  CPC .... B62D 63/061; B62D 63/062; B62D 63/08; B62D 33/027; B60P 1/43
  USPC ........................................................ 280/400
  See application file for complete search history.

(56) References Cited

U.S. PATENT DOCUMENTS

| | | | | |
|---|---|---|---|---|
| 1,247,282 A | * | 11/1917 | Kline ........................ | B60P 3/34 296/172 |
| 5,033,931 A | * | 7/1991 | Mann ........................ | B60P 1/24 296/57.1 |
| 6,102,468 A | * | 8/2000 | Lowrey ................... | B60P 3/341 296/169 |
| 6,213,053 B1 | * | 4/2001 | Lammers ............. | A01K 5/0107 119/51.01 |
| 6,669,269 B1 | * | 12/2003 | Tran-Ngoc ............. | B60P 3/341 296/156 |
| 6,739,617 B1 | * | 5/2004 | Martin ..................... | B60P 3/341 280/656 |
| 7,059,666 B2 | * | 6/2006 | Harrison ................. | B62D 33/03 296/186.4 |
| 7,073,816 B1 | * | 7/2006 | Larson .................. | B62D 63/061 280/656 |
| 7,175,205 B2 | | 2/2007 | Simpson | |
| 7,178,857 B2 | * | 2/2007 | Williams ................ | B60P 3/341 296/156 |
| 7,380,867 B2 | * | 6/2008 | Waas ....................... | B60P 3/341 296/159 |
| 7,887,141 B2 | | 2/2011 | Pieschel et al. | |
| 7,967,369 B2 | * | 6/2011 | Davidson ................ | B60P 3/341 296/173 |
| 8,042,854 B2 | * | 10/2011 | Braswell ................... | B60P 3/34 296/26.15 |

(Continued)

FOREIGN PATENT DOCUMENTS

| | | |
|---|---|---|
| GB | 0397990 | 9/1933 |
| GB | 1468851 | 3/1977 |

(Continued)

*Primary Examiner* — Joseph M Rocca
*Assistant Examiner* — Conan D Duda
(74) *Attorney, Agent, or Firm* — Ryan Kromholz & Manion, S.C.

(57) ABSTRACT

A utility trailer having outboard wheels, the trailer including a deck having a first height, a frame having an axle in which wheels attached to the axle have a second height, the second height extends a predetermined distance above the first height, opposed side panels are rotatably coupled to the frame, at least one of the opposed panels includes an opening having a third height, the third height being greater than the predetermined distance.

4 Claims, 4 Drawing Sheets

(56) References Cited

U.S. PATENT DOCUMENTS

| | | | | |
|---|---|---|---|---|
| 8,210,557 B2* | 7/2012 | Schneider | | B60D 1/07 280/416.1 |
| 9,266,460 B2* | 2/2016 | Jung | | E04H 3/28 |
| 2003/0173758 A1* | 9/2003 | Badger | | B60P 3/07 280/656 |
| 2003/0184055 A1* | 10/2003 | Badger | | B60P 3/07 280/656 |
| 2003/0197352 A1* | 10/2003 | Bordeleau | | B62D 63/061 280/656 |
| 2003/0218316 A1* | 11/2003 | Simpson | | B62D 63/061 280/656 |
| 2003/0222431 A1* | 12/2003 | Crosby | | B60P 3/122 280/656 |
| 2005/0093273 A1* | 5/2005 | McDonell | | B60D 1/155 280/656 |
| 2007/0031226 A1* | 2/2007 | Hynes | | B60P 1/00 414/482 |
| 2007/0262562 A1* | 11/2007 | Senatore | | B60D 1/54 280/491.1 |
| 2009/0001756 A1* | 1/2009 | Dempsey | | B60P 3/341 296/173 |
| 2009/0007948 A1* | 1/2009 | Dempsey | | B60P 3/341 135/96 |
| 2009/0026737 A1* | 1/2009 | Webb | | B62D 33/037 280/656 |
| 2009/0134605 A1* | 5/2009 | Norton | | B62D 63/062 280/656 |
| 2009/0212515 A1* | 8/2009 | Oyasaeter | | B62D 63/061 280/40 |
| 2009/0224512 A1* | 9/2009 | Winter | | B60D 1/143 280/639 |
| 2011/0121544 A1* | 5/2011 | Pearce | | B62D 63/061 280/641 |
| 2011/0204601 A1* | 8/2011 | Alvarino | | B62D 63/061 280/656 |
| 2011/0221168 A1* | 9/2011 | Alexander | | B62D 63/061 280/639 |
| 2012/0193942 A1* | 8/2012 | Nye | | B62D 33/027 296/191 |
| 2013/0038038 A1* | 2/2013 | Bernard | | B62D 63/062 280/415.1 |
| 2014/0312593 A1* | 10/2014 | Bank | | B62D 63/061 280/400 |
| 2015/0061259 A1* | 3/2015 | Fox | | B60P 3/122 280/415.1 |

FOREIGN PATENT DOCUMENTS

| | | |
|---|---|---|
| GB | 2394923 | 5/2004 |
| GB | 2475483 | 4/2015 |

* cited by examiner

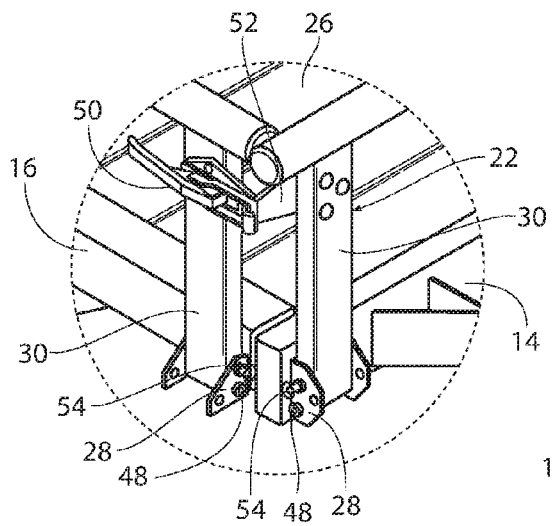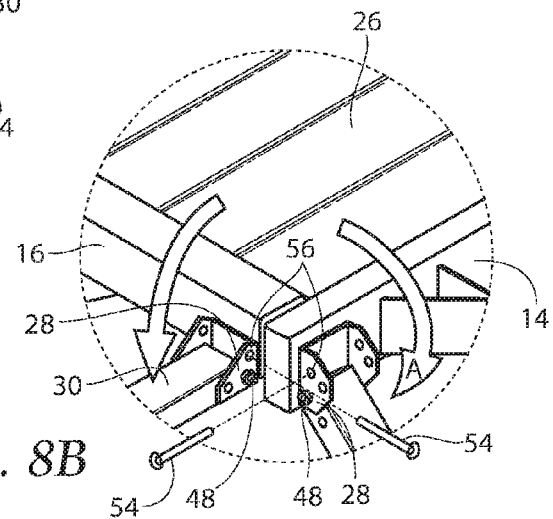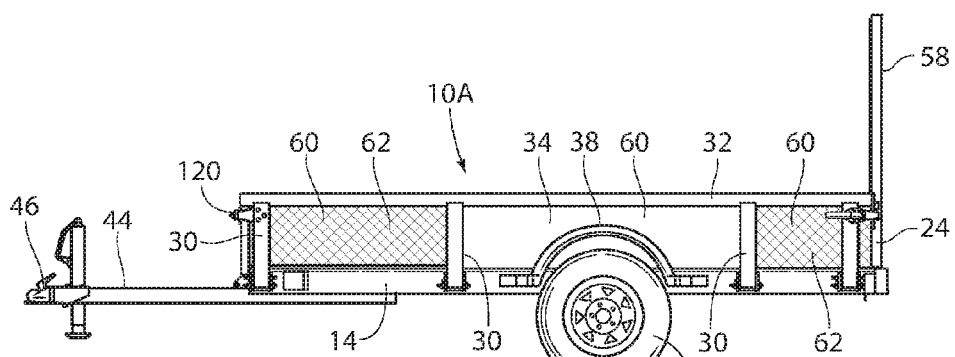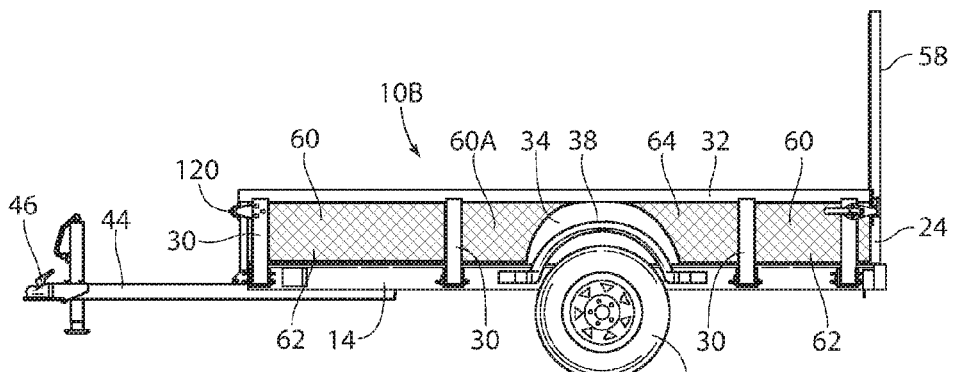

UTILITY TRAILER

BACKGROUND OF THE INVENTION

The present invention pertains to trailers intended to be towed by a motor vehicle. These trailers may be used for a variety of purposes including transporting luggage, materials, or sports machines. Such trailers are generally made from metal beams cut to the correct length and welded together and are commonly arranged with the deck over the wheels. Such trailers must be end loaded via a ramp or the like, or otherwise materials to be loaded must be lifted over the trailer sides. The arrangement of the deck over the wheels necessitates the deck to be elevated from the ground at a height at least greater than the wheel height. In order to side load a trailer such as this, it is necessary to lift the materials onto the elevated deck. This can be impractical when loading heavy objects. Moreover, the elevated center of gravity when such a trailer is fully loaded may cause instability. A new trailer is therefore desired which permits a lower center of gravity, having outboard wheels, with fully rotatable sides and arranged to permit side loading of the trailer with materials. Such an arrangement allows side loading with forklifts or the like, and greatly enhances the flexibility of use. It is further desired to design a new trailer which can be side-loaded easily to reduce the logistical problems associated with side-loading trailers having an elevated, deck-over-wheels configuration.

SUMMARY OF THE INVENTION

The invention provides a trailer having outboard wheels and fully rotatable side panels. The trailer of the present invention includes a front panel and two opposed side panels. The front and side panels are rotatably coupled to a floor panel or deck which is supported on a frame having an axle and at least two wheels. A least one of the side panels preferably includes an opening having a height above the deck that is greater than the height of the wheel and attached fender above the deck, such that as a side panel is rotated for loading of the trailer, the side panel clears the wheel and fender for complete rotation and clearance of the deck without interference from the wheel and fender. Moreover, the floor panel or deck is supported at a position lower than the height of the wheels. The trailer may further include a bumper coupled to the floor panel and a hinged ramp coupled to the bumper. The trailer preferably includes means for attaching the utility trailer to a vehicle.

BRIEF DESCRIPTION OF THE DRAWINGS

FIG. 8A is an enlarged portion of FIG. 2 and showing a hinge in the upright position.

FIG. 8B is an enlarged portion of FIG. 6 and showing a hinge in a rotated position.

FIG. 9 is a side elevation view similar to that of FIG. 3 but showing an alternative side panel.

FIG. 10 is a side elevation view similar to that of FIGS. 3 and 9 but showing an alternative side panel.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
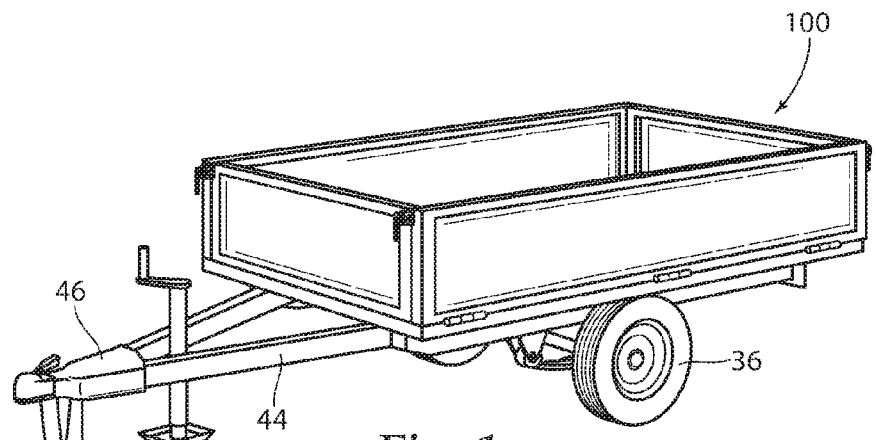
FIG. 1 is a perspective view of a prior art, deck-over-wheels trailer.

FIG. 1 illustrates a prior art trailer 100. As shown, the prior art trailer 100 includes a deck 26 positioned over the wheels 36, with the wheels 36 having a height less than the height of the deck.

Figure 2:
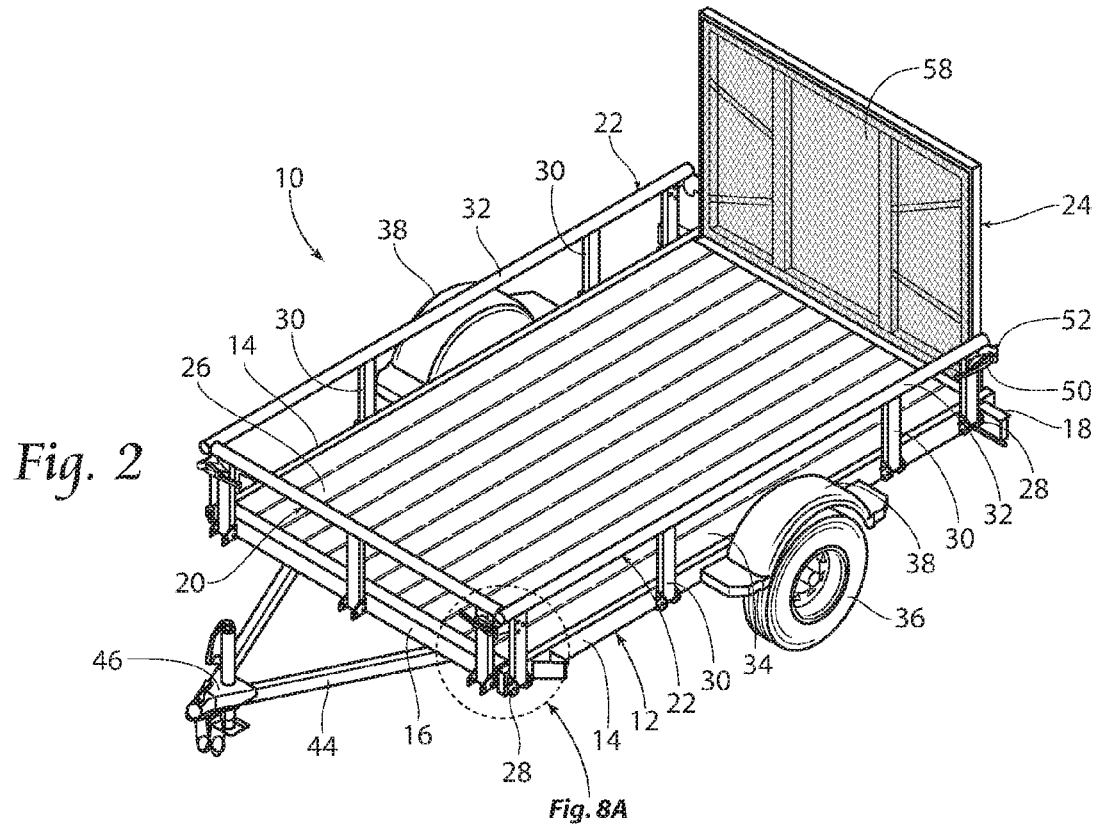
FIG. 2 is a perspective view of a trailer according to the present invention.

FIG. 2 shows a trailer 10 according to the present invention. As seen, the trailer 10 includes a frame 12 having a pair of opposed side frame rails 14, a front frame rail 16 and a rear frame rail 18. The trailer 10 further includes front panel 20, at least two spaced apart opposed side panels 22, a rear panel 24, and a deck 26. The panels 22, 24 being rotatably supported on the frame 12 by hinge members 28 (see also FIGS. 8A and 8B).

Figure 3:
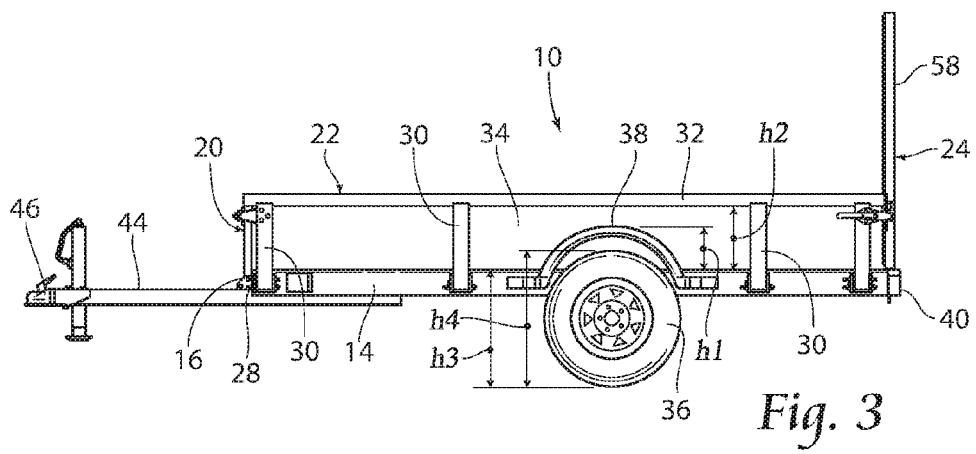
FIG. 3 is a side elevation view of the trailer illustrated in FIG. 2.
Figure 6:
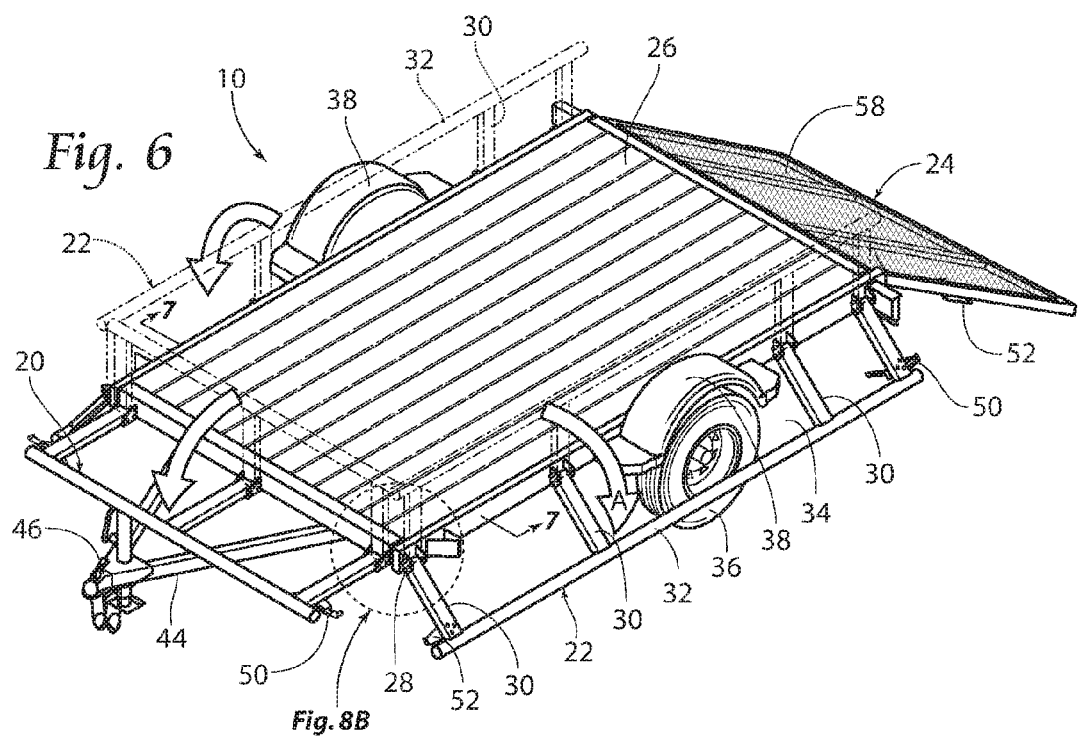
FIG. 6 is a view similar to that of FIG. 2 but showing the side panels, rear ramp and front panel rotated and in open position.

As may be seen particularly in the side view of FIG. 3, the side panels 22 may each include a plurality of upright posts 30, at least one panel rail 32 and at least one opening 34. The opening 34 having a height h2 above the deck 26 greater than the height h1 of the wheel 36 and the attached fender 38 above the deck 26, such that as a side panel 22 is rotated, as is shown in FIG. 6, the side panel 22 may clear the wheel 36 and fender 38 for complete rotation and clearance of the deck 26 without interference from the wheel 36 and fender 38.

As the view of FIG. 3 illustrates, the utility trailer 10 comprises a deck 26 wherein the deck has a first height h3, with a frame 12 attachable to and supporting the deck 26. The frame 12 includes an axle 42 in which wheels 36, and fender 38 if used, attached to the axle 42 have a second height h4, the second height h4 extends a predetermined distance h1 above the first height h3. The opposed side panels 22, are rotatably coupled to the frame 12 and at least one of the opposed side panels 22 includes an opening 34 having a third height h2. As shown, the third height h2 is greater than the predetermined distance h1. This arrangement allows the side panel 22 to fully rotate and avoid contact with the wheels 36 and fender 38 (if provided). Moreover, in addition to height, the size and shape of the opening 34 is preferably configured such that the side panel 22 easily clears the wheel 36 and fender 38 (see for example FIG. 10). This arrangement allows the side panels 22 to be fully rotated away from the deck 26 and to allow loading of material (not shown) onto the deck 26 without need to elevate the material to a deck 26 height greater than that of the wheels 36, as in prior deck-over arrangements. While the Figures depict the wheels 36 having fenders 38, it is to be understood that the trailer 10 may include wheels 36 not having fenders 38 and fall within the scope of the invention.

Figure 4:
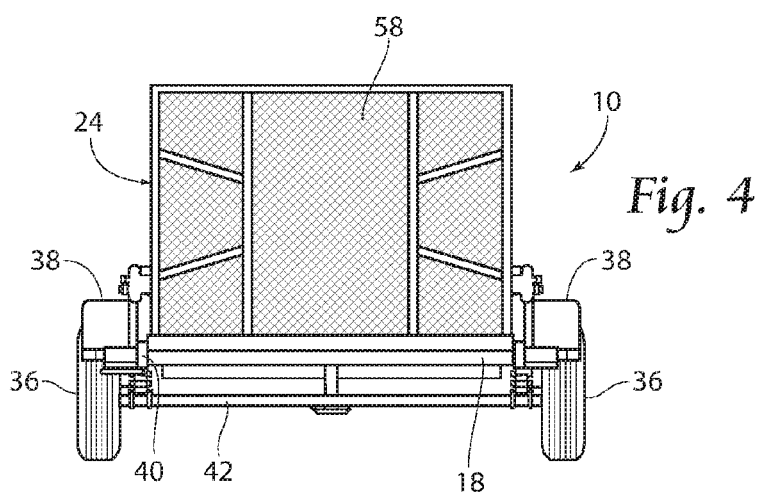
FIG. 4 is a rear elevation view of the trailer illustrated in FIGS. 2 and 3.
Figure 5:
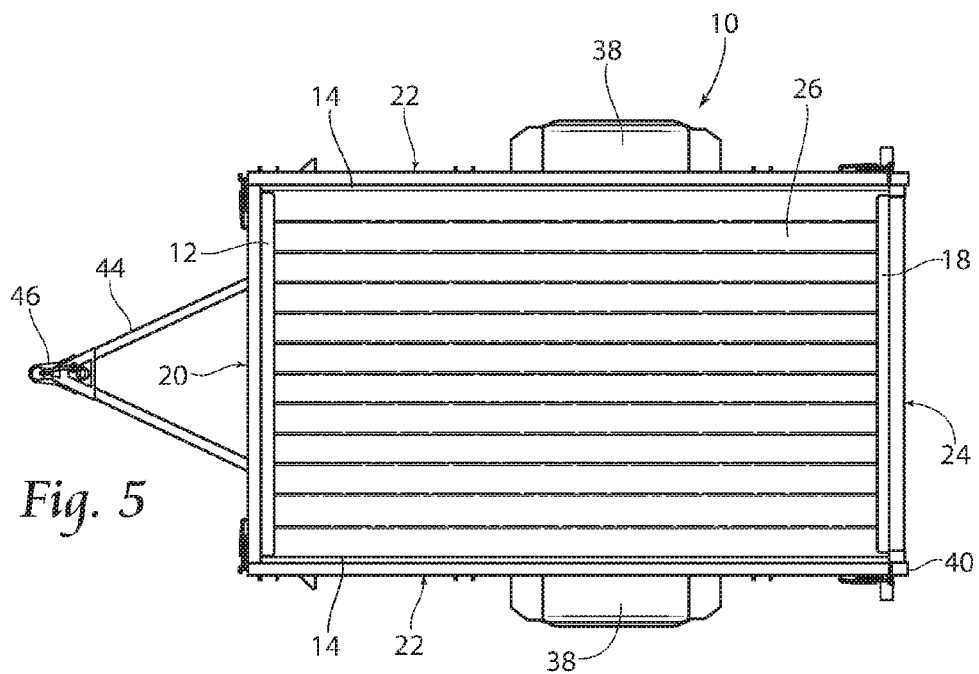
FIG. 5 is a top view of the trailer illustrated in FIGS. 2-4.

The views of FIGS. 3, 4, and 5 illustrate the trailer 10 as further including a bumper 40, an axle 42, a pair of tongue brackets 44 and a tongue 46. As is particularly illustrated in FIG. 3, the floor or deck 26 is positioned at a height below that of the wheels 36, with an outboard arrangement of the wheels 36 as is seen particularly in FIG. 5. As mentioned, each side panel 22 is arranged to pivot about a hinge member 28 such that a selected side panel 22 may rotate in the direction of arrow A (see FIG. 6) to gain access to the deck 26, as will be discussed.

FIGS. 8A and 8B illustrate a hinge member 28 for use in conjunction with the panels 20, 22. As is shown in FIG. 8A the hinge member 28 may include a hinge pin 48 about which the panels 20, 22 rotate. Moreover, and with particular attention to FIG. 8A, a panel 20, 22 may be secured in an upright position by a latch 50 attached to a selected upright post 30, and a catch 52 attached to an adjacent selected upright post 30. A quick release pin 54 may be further included to secure a selected panel 20, 22 in an upright position. Rotational movement of a panel 20, 22 on the hinge member 28 may be viewed in FIGS. 7 and 8B. As is shown, if a quick release pin 54 is used, the pin 54 is removed from its pin aperture 56, the latch 50 is removed from the catch 52 and the panel 20, 22 rotated in the direction of arrow A. While this arrangement is shown, it is to be understood that other methods of securing and pivoting the panels 20, 22 may be used without departing from the invention.

In a preferred embodiment of the invention, and as mentioned, the utility trailer 10 preferably further includes means for attaching the utility trailer 10 to a vehicle (not shown) for towing. As illustrated, a tongue 44 may be secured to the trailer 10 by a pair of tongue brackets 44. As seen in FIGS. 2 and 3, the tongue brackets 44 may be attached to the frame 12 in a traditional manner. The trailer 10 preferably further includes an axle 42 to support the wheels 36.

Figure 7:
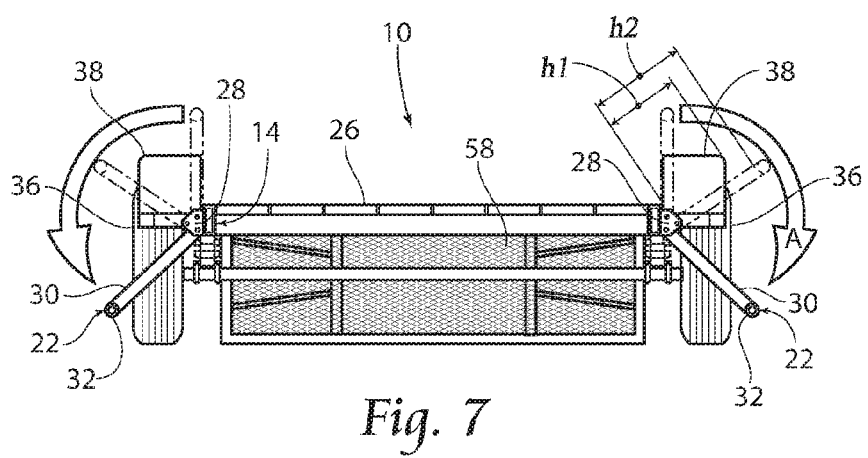
FIG. 7 is a cross sectional view of the trailer shown in FIG. 6 and taken along lines 7-7 thereof.

In an embodiment of the trailer 10 the rear panel 24 may be pivoting ramp 58. As is shown in FIG. 3, the ramp 58 may be attached to a rear frame rail 18 and bumper 40, and secured in its upright position by a pair of latches 50 attached to the either side of the ramp 58 and a pair of catches 52 each attached to a selected upright post 30 in the manner described with regard to the panels 20, 22. While this arrangement is shown, it is to be understood that other methods of securing the pivoting ramp 58 may be used without departing from the invention. FIGS. 4 and 5 are further views of a trailer 10 according to the present invention, and showing location of the outboard wheels 36 and optional fenders 38. FIGS. 6 and 7 illustrate the pivoting ramp 58 in a loading position wherein the latches 50 are disengaged from the catches 52 and the ramp 58 moved to the position shown. Although the ramp 58 illustrated in the Figures is shown as being taller than the side panels 20, 22, it is also contemplated that the ramp 58 could be of any height and still fall within the scope of the present invention.

FIGS. 9 and 10 illustrate an alternative side panel 120 for use with the present trailer 10A. In these views, the panels 120 are seen to include panel sections 60 wherein at least one of the panel sections 60 is fitted with a mesh 62 or otherwise solid material. Mesh 62 for use in this embodiment may be any suitable material such as metal or rigid polymer, as may be desired. The view of FIG. 9 illustrates two panel sections 60 having a mesh 62 with the panel section 60A adjacent the wheel 36 having an opening 34 configured as mentioned above. The view of FIG. 10 depicts another side panel 120 arrangement in which a portion 64 of the panel section 60 adjacent the wheel 36 includes a both a mesh 62 and an opening 34 configured as mentioned above. As in the previous embodiment, the opening 34 of side panel 120 is sized and shaped such that the side panel 120 easily clears the wheel 36 and fender 38 (see for example, FIG. 10). This arrangement allows the side panel 120 to be fully rotated away from the deck 26 and to allow loading of material (not shown) onto the deck 26 without need to elevate the material to a deck 26 height greater than that of the wheels 36, as in prior deck-over arrangements. As mentioned with regard to previous embodiments, it is to be understood although fenders 38 are shown in the Figures, it is within the scope of the invention to provide a utility trailer 10. 10A, 10B with or without fenders 38, as desired.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A utility trailer comprising:
    a deck wherein the deck has a first height relative to a traveling surface;
    a frame attachable to and supporting said deck, said frame having an axle in which wheels attached to said axle have a second height, said second height extending a predetermined distance above said first height; and
    opposed side panels, said opposed side panels being rotatably coupled to said frame such that said opposed side panels are rotatable from a first, upright position, relative to said deck, to a second, outwardly rotated position relative to said deck, at least one of said opposed panels including an opening having a third height from the top of the opening to the deck, said third height being greater than said predetermined distance; and
    wherein one of the wheels is at least partially disposed in the opening when the at least one of said opposed panels including the opening is in the second outwardly rotated position.

2. The utility trailer of claim 1 further including a front panel and a rear panel.

3. The utility trailer of claim 2 wherein said rear panel is a hinged ramp.

4. The utility trailer of claim 1 further including means for attaching said utility trailer to a vehicle.

* * * * *